United States Patent [19]
Zelinger

[11] Patent Number: 5,148,769
[45] Date of Patent: Sep. 22, 1992

[54] AMUSEMENT DEVICE HAVING SUCTION CUP BASE AND INTERCHANGEABLE PET TOY

[75] Inventor: Alan Zelinger, Monsey, N.J.
[73] Assignee: Ethical Products, Inc., Newark, N.J.
[21] Appl. No.: 790,504
[22] Filed: Nov. 12, 1991
[51] Int. Cl.⁵ .............................................. A01K 15/00
[52] U.S. Cl. .................................. 119/29; 273/58 C; 273/413
[58] Field of Search ................. 119/29, 29.5; 446/154, 446/227; 273/26 E, 200 R, 58 C, 413

[56] References Cited
U.S. PATENT DOCUMENTS

| | | | |
|---|---|---|---|
| 3,006,647 | 10/1961 | Haskett | 273/26 E |
| 3,114,546 | 12/1963 | Verseghy | 273/58 C |
| 3,290,817 | 12/1966 | Kravath | 446/227 |
| 3,295,499 | 1/1967 | Manchester | 119/29 |
| 3,970,303 | 7/1976 | Levering | 273/413 |
| 4,712,510 | 12/1987 | Tae-Ho | 119/29 |

FOREIGN PATENT DOCUMENTS 765869 1/1957 United Kingdom ............... 446/227

*Primary Examiner*—John J. Wilson
*Assistant Examiner*—Todd E. Manahan

[57] ABSTRACT

A toy or amusement device for pet animals includes an arcuately shaped spring-like wire removably mounted at one end to a suction cup base and extending generally upwardly and sidewardly therefrom. The free end of the wire has a toy removably suspended therefrom. The base is removably mounted to a mounting surface as by suction, and which mounting surface may be a variety of orientations.

11 Claims, 2 Drawing Sheets

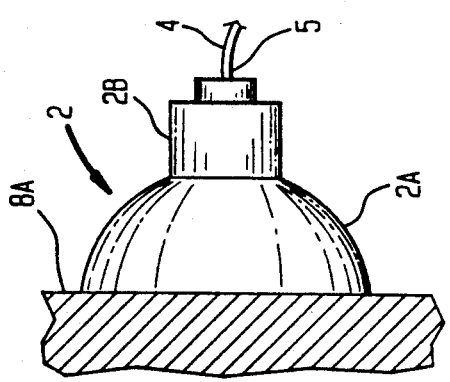
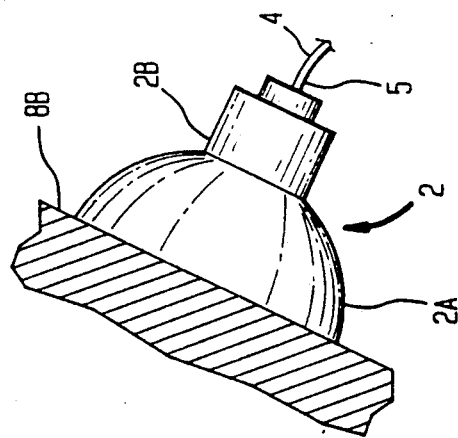
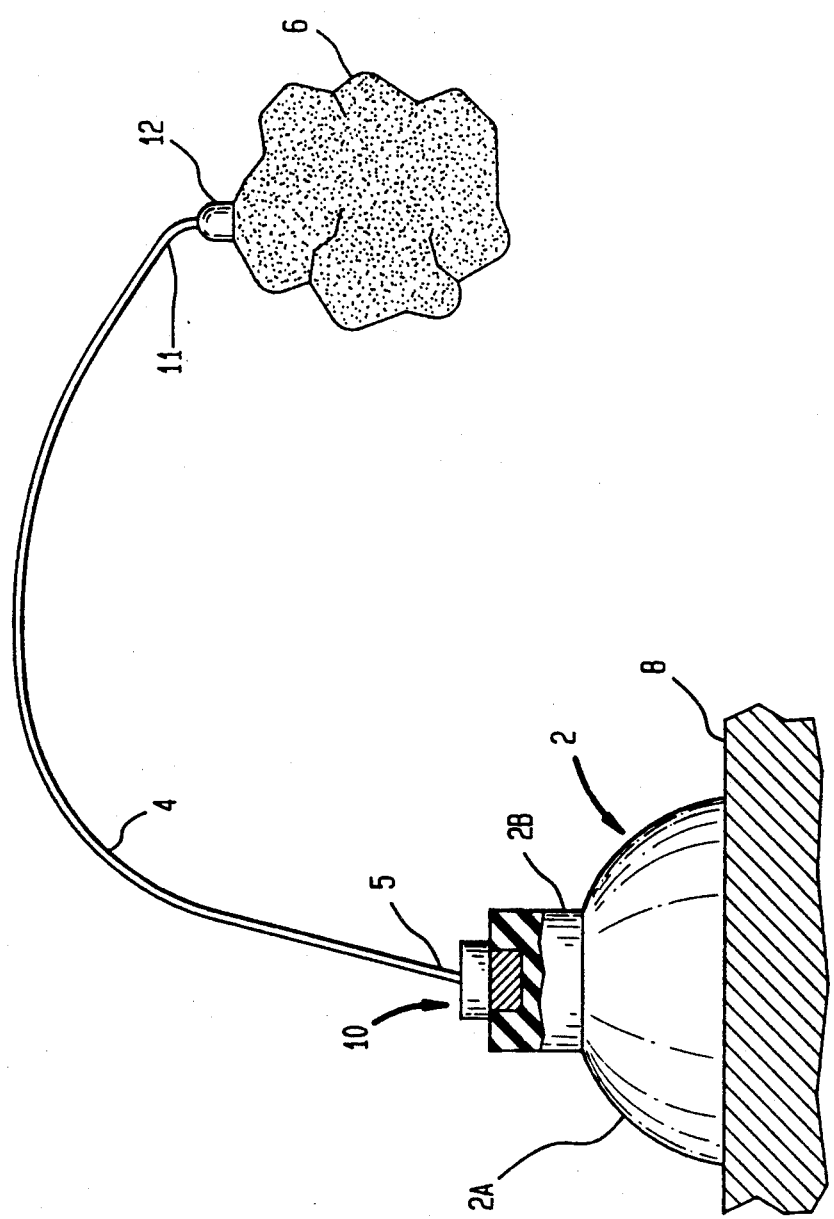

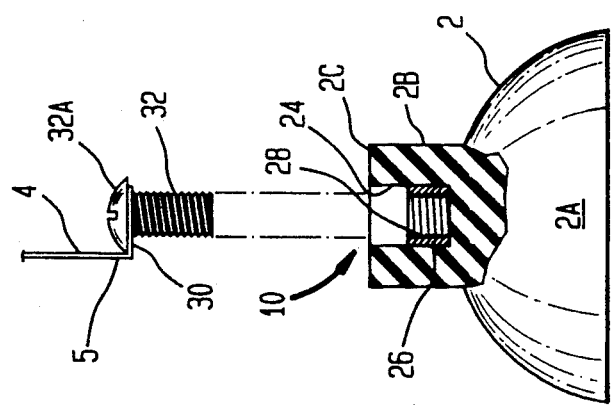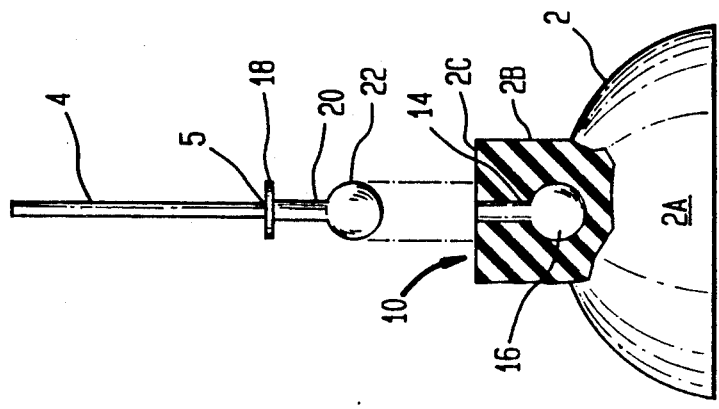

AMUSEMENT DEVICE HAVING SUCTION CUP BASE AND INTERCHANGEABLE PET TOY

BACKGROUND OF THE INVENTION

This invention relates generally to a toy or amusement device for a pet animal such as a cat or dog. More particularly, this invention relates to a device of the type described which includes an elongated wire mounted at one end to a base and extending arcuately upwardly and sidewardly away from the base, with a play object secured to the free end of the elongated wire.

Animal toys and amusement devices of various descriptions are known. In this regard, reference is made to: U.S. Pat. No. 4,940,018 (U.S. Cl. 119/29) which issued to Edling on Jul. 10, 1990; U.S. Pat. No. 4,517,922 (U.S. Cl. 119/29) which issued to Lind on May 21, 1985; U.S. Des. Pat. No. 295,798 (D30/160) which issued to Boelke on May 17, 1985; and U.S. Pat. No. 4,930,448 (U.S. Cl 119/29) Which issued to Robinson on Jun. 5, 1990.

The Edling patent relates to a toy for cats, wherein a toy member hangs from the end of a line or string which in turn is suspended from the upper end of a flexible rod. The flexible rod is mounted in a base by a coil spring. When the toy member is batted by a cat, it moves through a complex pattern of movement due to the pendulum motion of the rod and a separate pendulum-like motion of the line and toy member.

The Lind patent teaches a flat horizontal base and a post secured to the base. A coil spring is secured to the upper end of the post and extends upwardly therefrom so that the free outer end of the coil spring is positioned over and above the central portion of the base. A pet toy is attached to a cord which hangs from the outer end of the coil spring, whereby the toy moves relative to the base when contacted by the pet.

The Boelke patent shows an ornamental design for a cat toy or similar article including an arcuate wire-like member.

The Robinson patent relates to an animal toy wherein an elongated wire-like member is secured at one end to a battery operated rotatable member. The wire-like member extends arcuately upwardly and generally sidewardly from a housing for the rotatable member and a toy is secured to the free end of the elongated wire member for movement in a path around the housing upon rotation of the rotatable member. The Robinson toy is operated independent of contact by the pet so as to be dragged along the ground in a generally circular path by rotation of the rotatable member.

The applicant is also aware of other pet toys and amusement devices. For example, a toy marketed as the CIZER ACTION PACKED TOY is available. This toy features a weighted base and a spring wire MOUNTED TO THE BASE AND EXTENDING ARCUATELY upwardly and sidewardly therefrom for swinging a full three hundred and sixty-five degrees therearound when a toy supported at the free end of the spring wire is batted by a cat or other animal.

Ethical Products, Inc., assignee of the present invention, markets a cat toy under the BAT-A-MOUSE trade designation. This device features a suction cup and a substantially vertically extending member having one end supported therein. A toy is mounted to the free end of the vertically extending member. The vertically extending member is resilient so that it will move in vibratory fashion when batted by an animal, with the toy moving therewith.

The present invention is an improvement over the aforementioned prior art devices as will be hereinafter discerned and provides a device which is intended for maximum enjoyment by the animal.

SUMMARY OF THE INVENTION

This invention contemplates a toy or amusement device for pet animals wherein a base is provided in the form of a suction cup which is removably mountable to a variety of supporting surfaces and which surfaces may be in a variety of orientations. A spring-like wire member is removably mounted at one end to the suction cup base and extends arcuately therefrom in a generally upwardly and sidewardly direction. A toy or amusement object is interchangeably suspended at the free end of the wire-like member for random movement when batted by a cat or other pet animal so as to amuse the animal. The suction cup configuration of the base precludes the device from being displaced on the supporting surface during use as is desireable, and the spring-like wire member is mounted to the base to insure random motion of the member and hence the toy suspended at the free end thereof when batted by a pet animal for maximum enjoyment by the animal. The arrangement whereby the toy is interchangeably suspended at the free end of the spring-like wire member enhances the utility of the device since the toy may be replaced with another toy as may suit the temperament of the animal, or as may be necessary when the toy wears out after extensive use.

BRIEF DESCRIPTION OF THE DRAWINGS

FIG. 1 is a partially sectioned diagrammatic representation generally illustrating the invention, wherein the invention is supported on a horizontal supporting surface.

FIG. 2 is a diagrammatic representation showing the invention supported on a vertical supporting surface.

FIG. 3 is a diagrammatic representation showing the invention supported on an inclined supporting surface.

FIG. 4 is a diagrammatic, partially sectioned exploded representation illustrating one form of the invention for mounting a spring-like wire to a base.

FIG. 5 is a diagrammatic partially sectioned exploded representation illustrating another form of the invention for mounting the spring-like wire to the base.

FIG. 6 is a diagrammatic representation illustrating a suspension arrangement for suspending a toy or an amusement device to the free end of the spring-like wire in accordance with the invention.

DETAILED DESCRIPTION OF THE INVENTION

With reference to FIG. 1, the invention includes a base 2, an elongated spring-like wire 4 and a pet toy or amusement device 6. Base 2, which may be of a synthetic rubber such as, for example, one of the commonly used elastomers having a desired elasticity, is in the form of a suction cup and has a mounting section 2A and a neck section 2B. Mounting section 2A is removably affixed by suction to a supporting surface 8. Mounting surface 8 is shown in FIG. 1 as a substantially horizontal surface.

Neck section 2B of base 2 carries a mounting arrangement 10 which mounts spring-like wire 4 at one end 5 thereof to base 2. In the preferred embodiment of the invention, spring-like wire 4 is of a suitable stainless steel having desired spring characteristics, and is approximately 0.055 inches in diameter and thirty-six inches long. Spring-like wire 4 is generally arcuate in shape so that when mounted at end 5 to base 2 by mounting arrangement 10, the spring-like wire extends substantially upwardly and sidewardly from base 2.

Pet toy or amusement device 6 is suspended from the free end 11 of spring-like wire 4 by a suspension arrangement 12.

Particular forms of mounting arrangement 10 and suspension arrangement 12 will be shown and described with reference to FIGS. 4, 5 and 6.

While base 2 is shown in FIG. 1 as removably affixed to a substantially horizontal mounting surface 8, it may be so affixed as well to surfaces having other orientations. This particular advantage of the suction cup configuration of base 2 is illustrated in FIGS. 2 and 3. Thus, in FIG. 2, mounting section 2A of base 2 is removably affixed as by suction to a generally vertical surface 8A. In FIG. 3, mounting section 2A of base 2 is removably affixed to a generally inclined mounting surface 8B, likewise as by suction. It will be appreciated that base 2 may be removably affixed via suction to a variety of surfaces and a variety of orientations, as is advantageous for the purposes of the invention.

With reference to FIG. 4, a particular form of mounting arrangement 10 is illustrated. Thus, neck portion 2B of base 2 includes an axially disposed longitudinally extending elongated channel 14 terminating in a spherical opening 16. Mounting end 5 of spring-like wire 4 terminates in a displacement limiting washer 18 having a rod-like portion 20 extending therefrom, and which rod-like portion 20 terminates in a spherical ball 22. In mounting spring-like wire 4 to base 2, ball 4 is forced downwardly through channel 14 via the elasticity of the base material so as to rest in spherical opening 16. Rod-like portion 20 is snugly disposed in channel 14. The displacement of ball 20 is limited by limiting washer 18 which is disposed adjacent end 2C of neck portion 2B of base 2.

With reference to FIG. 5, another particular form of mounting arrangement 10 is illustrated. In this form of the invention, neck portion 2B of base 2 carries an axially disposed longitudinally extending elongated hole 24. An insert 26 is disposed at the bottom-most portion of elongated hole 24 and carries threads 28. Spring-like wire member 4 has a loop 30 at mounting end 5 thereof extending substantially normal to the mounting end, and a screw or the like 32 is inserted through loop 30. Screw 32 is disposed through elongated hole 24 so as to be in threaded engagement with threads 28 of insert 26. Loop 30 is disposed adjacent end 2C of neck portion 2B of base 2 and is captured thereon by head 32A of screw 32.

With the configurations described in FIGS. 4 and 5, spring-like wire 4 is securely and removably mounted to base 2, but yet provides consistent spring-like action as is required for the purposes of the invention without becoming dislodged from the base. In the event removal of spring-like wire 4 from base 2 is necessary as may be the case for one reason or another, the spring-like wire needs only to be pulled away from neck 2B of base 2 in the form of the invention shown in FIG. 4 and screw 32 needs only to be disengaged from threads 28 of insert 26 in the form of the invention shown in FIG. 5.

With reference now to FIG. 6, suspension arrangement 12 for suspending toy or amusement device 6 from free end 11 of spring-like wire 4 is shown in substantial detail. Thus, the free end of the spring-like wire is formed as a loop 4A. Loop 4A is inserted in a split ring 34, and which split ring 34 is similar to a conventional split ring for holding keys and the like.

A generally U-shaped wire hook member is designated by the numeral 36. One of the legs 36A of hook member 36 is longer than the other of the legs 36B thereof. Hook member 36 is inserted in toy 6, which may be of a penetrable material, with the longer leg 36A extending therethrough and terminating in a loop 36C. Base end 36D of U-shaped member 36 extends beyond toy 6 and is supported by split ring 34 so that toy 6 is suspended therefrom. A bell or the like 38 is suspended from loop 36C to enhance the invention.

With the arrangement described, toy 6 can easily be removed and replaced as by manipulating end 36D of U-shaped hook 36 away from split ring 34, or, alternatively, by manipulating loop 4A of wire-like member 4 away from split ring 34, as the case may be.

There has thus been described an animal toy or amusement device featuring a generally arcuately shaped spring-like wire mounted to a suction cup base and having a toy or the like extending from the free end thereof which is randomly displaced when batted by a pet. The arrangement is such that the spring-like wire extends generally upwardly and sidewardly from the base. The spring-like wire is removably mounted to the base and the toy is removably suspended by the spring-like wire. The suction cup base may be removably mounted to a variety of surfaces, smooth or otherwise, and having a variety of orientations as is advantageous for the purposes of the invention. In accordance with the above, the invention is seen as a distinct improvement over like animal toy or amusement devices now known in the art.

With the above description of the invention in mind, reference is made to the claims appended hereto for a definition of the scope of the invention.

What is claimed is:

1. A toy device for the amusement of pet animals, comprising:

a suction cup base having a mounting section and a neck section, the mounting section removably affixed by suction to a supporting surface;

an elongated, generally arcuately shaped spring-like wire;

means arranged with one end of the wire and with the base neck section for removably mounting the wire to the base, whereby the wire extends substantially upwardly and sidewardly from the base;

a pet animal amusement object;

means arranged with the other end of the wire and with the amusement object for removably suspending said amusement object from said other wire end including the other wire end being formed as a loop, a split ring, the loop at the other wire end being disposed on the split ring, a generally U-shaped hook inserted in the amusement object so that a base of the hook extends from said object and said hook having a first leg and a second leg longer than the first leg so as to extend through the amusement object, with the end of the second leg terminating in a loop, and the base of the hook extending from the object being disposed on the split ring; and the wire, the wire mounting means, the amusement object and the amusement object suspending means cooperating to provide random movement of the amusement object when said object is batted by a pet animal.

2. A device as described by claim 1, wherein the means arranged with one end of the wire and with the base neck section for removably mounting the wire to the base includes:

the base neck section having an end;

an axially disposed longitudinally extending elongated channel extending from the end of the base neck section into said base neck section;

a spherical opening at the terminus of the channel within the base neck section;

the one end of the wire terminating in a displacement limiting member with a rod-like portion extending therefrom, said rod-like portion terminating in a spherical member; and the spherical member being formed downwardly through the channel via the elasticity of the base so that the spherical member rests in the spherical opening, the rod-like portion is snugly disposed in the channel, and the displacement limiting member is disposed adjacent the end of the base neck section.

3. A device as described by claim 1, wherein the means arranged with one end of the wire and with the base neck section for removably mounting the wire to the base includes:

the base neck section having an end;

an axially disposed longitudinally extending hole extending from the end of the base neck section into said base neck section;

an internally threaded insert disposed at the end of the hole within the base neck section;

the one end of the wire terminating in a loop extending substantially normal to the wire; and a threaded member having a head, said threaded member disposed through the hole so as to be in threaded engagement with the insert, with the loop being adjacent the end of the base neck portion and captured thereon by the threaded member head.

4. A device as described by claim 1, including:

an audible device supported on the loop on the end of the second leg.

5. A method for suspending a toy device for the amusement of pet animals, comprising:

using a suction cup as a base having a mounting section and a neck section and removably affixing the mounting section by suction to a supporting surface;

using an elongated, generally arcuately shaped spring-like wire;

arranging one end of the wire with the base neck section for removably mounting the wire to the base, whereby the wire extends substantially upwardly and sidewardly from the base;

arranging the other end of the wire with the amusement object for removably suspending said amusement object from said other wire end;

forming the other wire end in a loop;

disposing the loop on a split ring;

inserting a generally U-shaped hook in the amusement object so that a base of the hook extends from said object and one leg of the hook extends through the amusement object;

terminating the one leg end in a loop;

and disposing the base of the hook extending from the object on the split ring.

6. A method as described in claim 5, wherein arranging one end of the wire with the base neck section for removably mounting the wire to the base includes:

providing the base neck section with an end;

providing an axially disposed longitudinally extending elongated channel extending from the end of the base neck section into said base neck section;

terminating the channel in a spherical opening within the base neck section;

terminating the one end of the wire in a displacement limiting member with a rod-like portion extending therefrom, and terminating the rod-like portion in a spherical member; and forcing the spherical member downwardly through the channel via the elasticity of the base for resting the spherical member in the spherical opening, for snugly disposing the rod-like member in the channel, and for disposing the displacement limiting member adjacent the end of the base neck section.

7. A method as described by claim 6, including:

pulling the one end of the wire away from the base neck section against the elasticity of the base for disengaging the spherical member from the spherical opening and for disengaging the rod-like member from the channel, thereby removing the wire from the base.

8. A method as described by claim 5, wherein arranging one end of the wire with the base neck section for removably mounting the wire to the base includes:

providing the base neck section with an end;

providing an axially disposed longitudinally extending hole extending from the end of the base neck section into said base neck section;

disposing an internally threaded insert at the end of the hole within the base neck section;

terminating the one end of the wire in a loop extending substantially normal to the wire; and disposing a treaded member having a head through the hole and the loop so as to be in threaded engagement with the insert, with the loop being adjacent the end of the base neck section and being captured thereon by the threaded member head.

9. A method as described in claim 8, including:

disengaging the threaded member from threaded engagement with the hole for removing the wire from the base.

10. A device as described by claim 5, including:

removing the amusement object from the wire by manipulating the base of the U-shaped hook away from the split ring.

11. A method as described by claim 5, including:

supporting an audible device in the loop on the one leg end.

* * * * *